(12) United States Patent
Murata et al.

(10) Patent No.: US 9,299,978 B2
(45) Date of Patent: Mar. 29, 2016

(54) NEGATIVE ELECTRODE MATERIAL FOR LITHIUM BATTERY

(71) Applicant: SHOWA DENKO K.K., Minato-ku, Tokyo (JP)

(72) Inventors: Hirokazu Murata, Tokyo (JP); Nobuaki Ishii, Tokyo (JP); Masataka Takeuchi, Tokyo (JP); Mohit Jain, East Brunswick, NJ (US); Nader M. Hagh, Franklin Park, NJ (US); Farid Badway, Old Bridge, NJ (US); Krista Martin, Edgewater, NJ (US)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 13/875,654

(22) Filed: May 2, 2013

(65) Prior Publication Data

US 2013/0295446 A1 Nov. 7, 2013

Related U.S. Application Data

(60) Provisional application No. 61/641,810, filed on May 2, 2012.

(51) Int. Cl.
*H01M 4/133* (2010.01)
*H01M 10/0525* (2010.01)
*H01M 10/0569* (2010.01)
*H01M 4/134* (2010.01)
*H01M 4/36* (2006.01)
*H01M 4/38* (2006.01)
*H01B 1/12* (2006.01)
*H01M 4/64* (2006.01)
*H01M 4/62* (2006.01)

(52) U.S. Cl.
CPC .............. *H01M 4/133* (2013.01); *H01B 1/122* (2013.01); *H01M 4/134* (2013.01); *H01M 4/366* (2013.01); *H01M 4/38* (2013.01); *H01M 4/387* (2013.01); *H01M 4/388* (2013.01); *H01M 10/0525* (2013.01); *H01M 10/0569* (2013.01); *H01M 4/621* (2013.01); *H01M 4/624* (2013.01); *H01M 4/64* (2013.01); *Y02E 60/122* (2013.01); *Y02P 70/54* (2015.11); *Y02T 10/7011* (2013.01)

(58) Field of Classification Search
CPC ....................................................... H01M 4/133
USPC .................... 429/231.8, 367, 36, 213, 188
See application file for complete search history.

(56) References Cited

U.S. PATENT DOCUMENTS

| 2002/0061445 A1* | 5/2002 | Kitagawa et al. ........ 429/231.8 |
| 2003/0175579 A1* | 9/2003 | Uchida et al. ................ 429/42 |
| 2008/0056928 A1* | 3/2008 | Bunce et al. .................. 419/36 |
| 2012/0132859 A1* | 5/2012 | Lestriez et al. .............. 252/503 |

FOREIGN PATENT DOCUMENTS

| JP | 11-214004 | * | 8/1999 |
| WO | WO 2010116083 | * | 10/2010 |

OTHER PUBLICATIONS

JP 11-214004 MT.*

* cited by examiner

*Primary Examiner* — Patrick Ryan
*Assistant Examiner* — Alex Usyatinsky
(74) *Attorney, Agent, or Firm* — Sughrue Mion, PLLC

(57) ABSTRACT

A negative electrode material for a lithium ion battery, in which a fine particle (A) containing an element selected from Si, Sn, Ge and In and a carbon particle (B) obtained by heat-treating a petroleum-based coke and/or a coal-based coke at a temperature of 2,500° C. or more are connected through a chemical bond such as urethane bond, urea bond, siloxane bond and ester bond. Also disclosed are a negative electrode sheet obtained by coating a current collector with a paste containing the negative electrode material, a binder and a solvent, and then drying and pressure-forming the paste; and a lithium ion battery incorporating the negative electrode sheet.

16 Claims, 2 Drawing Sheets

NEGATIVE ELECTRODE MATERIAL FOR LITHIUM BATTERY

This application claims benefit of Provisional Application No. 61/641,810 filed May 2, 2012, incorporated herein by reference in its entirety.

BACKGROUND OF THE INVENTION

1. Field of the Invention

The present invention relates to a negative electrode material for a lithium ion battery and use thereof. More specifically, the present invention relates to a negative electrode material capable of providing a lithium ion battery having a large charge/discharge capacity, and further, being excellent in the charge/discharge cycle characteristics and rapid charge/discharge characteristics, a paste containing the negative electrode material, a negative electrode sheet obtained by coating the paste, and a lithium ion battery incorporating the negative electrode sheet.

2. Description of the Related Art

Polyfunctionalization of portable electronic devices is proceeding at a high speed, outstripping the power savings of an electronic component and in turn, the power consumption of portable electronic devices is increasing. In this regard, realization of a high-capacity, small-size lithium ion battery as a main power source of a portable electronic device is more keenly in demand than ever. In addition, the growth in demand for an electric vehicle is also driving a strong need for fabrication of a high-capacity lithium ion battery used therein.

In conventional lithium ion batteries, graphite is predominantly used as a negative electrode material. Since Li which can be occluded in graphite is limited to the stoichiometric ratio in $LiC_6$, the theoretical capacity of a lithium ion battery using graphite as the negative electrode is 372 mAh/g.

In order to realize fabrication of a high-capacity lithium ion battery, studies are being conducted for use of a particle containing a metal element having a large theoretical capacity, such as Si and Sn, as the negative electrode material. For example, when an Si-containing particle is used for the negative electrode material, the theoretical capacity of the lithium ion battery is 4,200 mAh/g. Since the theoretical capacity of a lithium battery using metallic lithium is 3,900 mAh/g, when Si or the like is used as the negative electrode material, there is an expectation that a high-capacity lithium battery of smaller size can be obtained. However, a negative electrode material such as Si exhibits a large percentage of expansion or contraction on intercalation/deintercalation (occlusion/release) of a lithium ion. As a result, a gap is produced between particles, thus failing to obtain as large a capacity as expected. Furthermore, the particles are crushed to a fine powder due to repetition of large expansions or contractions. Further, the resulting break in electrical contact leads to an increase in the internal resistance and in turn, a short charge/discharge cycle life of the lithium ion battery thus obtained.

Proposals made to solve these problems include, for example, a negative electrode material containing an Si- and/or Sn-containing particle and carbon fiber (Patent Document 1), a negative electrode material obtained by attaching a carbonaceous material containing an Si-containing particle and carbon fiber to the surface of a graphite particle (Patent Document 2), a negative electrode material composed of a mixture of a metallic particle such as Si, Sn and Ge and a graphite particle having a $d_{002}$ of 0.3354 to 0.338 nm and an area ratio of G/D≥9 between the G peak and D peak as measured by Raman spectroscopy (Patent Document 3), and a negative electrode material composed of a solid solution containing an element capable of occluding/releasing a lithium ion, such as Si and Ge, and an element incapable of occluding/releasing a lithium ion, such as copper (Patent Document 4).

[Patent Document 1] JP-A-2004-178922 (the term "JP-A" as used herein means an "unexamined published Japanese patent application")
[Patent Document 2] JP-A-2004-182512
[Patent Document 3] JP-A-2004-362789
[Patent Document 4] JP-A-2002-075350

SUMMARY OF THE INVENTION

It is therefore an object of the present invention to provide a negative electrode material capable of providing a lithium ion battery ensuring a large charge/discharge capacity and a small increase in resistance on charging/discharging, and further, being excellent in charge/discharge cycle characteristics and rapid charge/discharge characteristics.

The present inventors have made intensive studies to attain the above-described object, and as a result, the present invention including the following embodiments has been achieved.

[1] A negative electrode material for a lithium ion battery, obtained by connecting a fine particle (A) containing an element capable of occluding/releasing a lithium ion and a carbon particle (B) through a chemical bond.

[2] The negative electrode material for a lithium ion battery as described in [1], wherein the chemical bond is at least one bond selected from the group consisting of a urethane bond, a urea bond, a siloxane bond and an ester bond.

[3] The negative electrode material for a lithium ion battery as described in [1] or [2], wherein the amount of the fine particle (A) is from 5 to 100 parts by mass per 100 parts by mass of the carbon particle (B).

[4] The negative electrode material for a lithium ion battery as described in any one of [1] to [3], wherein the element capable of occluding/releasing a lithium ion is at least one element selected from the group consisting of Si, Sn, Ge and In.

[5] The negative electrode material for a lithium ion battery as described in any one of [1] to [4], wherein the fine particle (A) has a 90% particle diameter ($D_{90}$) in a number-based cumulative particle size distribution of 500 nm or less.

[6] The negative electrode material for a lithium ion battery as described in any one of [1] to [5], wherein the carbon particle (B) has a 50% particle diameter ($D_{50}$) in a volume-based cumulative particle size distribution of from 2 to 15 µm.

[7] The negative electrode material for a lithium ion battery as described in any one of [1] to [6], wherein the fine particle (A) is attached to the surface of the carbon particle (B).

[8] The negative electrode material for a lithium ion battery as described in any one of [1] to [7], wherein the carbon particle (B) is a graphite particle obtained by heat-treating a petroleum-based coke and/or a coal-based coke at a temperature of 2,500° C. or more.

[9] The negative electrode material for a lithium ion battery as described in any one of [1] to [7], wherein the carbon particle (B) is a carbonaceous particle obtained by heat-treating a petroleum-based coke and/or a coal-based coke at a temperature of 800 to 1,500° C.

[10] The negative electrode material for a lithium ion battery as described in any one of [1] to [7], wherein the carbon particle (B) contains:
a graphite particle obtained by heat-treating a petroleum-based coke and/or a coal-based coke at a temperature of 2,500° C. or more, and a carbonaceous layer present on the surface of the graphite particle, in which a ratio $I_D/I_G$ (R value) between the intensity ($I_D$) of a peak in a range of 1,300 to 1,400 cm$^{-1}$ and the intensity ($I_G$) of a peak in a range of 1,580 to 1,620 cm$^{-1}$ as measured by Raman spectroscopy is 0.1 or more.

[11] The negative electrode material for a lithium ion battery as described in [10], wherein the carbonaceous layer is obtained by attaching an organic compound to the graphite particle and heat-treating at a temperature of 200 to 2,000° C.

[12] The negative electrode material for a lithium ion battery as described in [11], wherein the organic compound is at least one member selected from the group consisting of a petroleum-based pitch, a coal-based pitch, a phenol resin, a polyvinyl alcohol resin, a furan resin, a cellulose resin, a polystyrene resin, a polyimide resin and an epoxy resin.

[13] The negative electrode material for a lithium ion battery as described in any one of [10] to [12], wherein the amount of the carbonaceous layer present on the surface of the graphite particle is from 0.05 to 10 parts by mass per 100 parts by mass of the graphite particle.

[14] A method for producing the negative electrode material for a lithium ion battery as described in any one of [1] to [13], comprising:
a step of modifying a carbon particle with a silane coupling agent to obtain a modified carbon particle (B),
a step of modifying a fine particle containing an element capable of occluding/releasing a lithium ion with a silane coupling agent to obtain a modified fine particle (A), and
a step of connecting the modified carbon particle (B) and the modified fine particle (A) through a chemical bond.

[15] The production method as described in [14], wherein the carbon particle (B) is obtained by first oxidizing a carbon particle and then modifying the oxidized carbon particle to obtain the modified carbon particle (B).

[16] A negative electrode sheet comprising:
a current collector, and
a layer containing a binder, a conductive additive, and the negative electrode material as described in any one of [1] to [13], said layer covering the surface of the current collector.

[17] A lithium ion battery comprising at least one member selected from the group consisting of a nonaqueous electrolytic solution and a nonaqueous polymer electrolyte, a positive electrode sheet, and the negative electrode sheet described in [16].

[18] The lithium ion battery as described in [17], comprising a nonaqueous electrolytic solution containing at least one member selected from the group consisting of ethylene carbonate, diethyl carbonate, dimethyl carbonate, ethyl methyl carbonate, propylene carbonate, butylene carbonate, γ-butyrolactone and vinylene carbonate.

Effect of the Invention

By employing the negative electrode material of the present invention, a lithium ion battery ensuring a large charge/discharge capacity and a small increase in resistance on charging/discharging, and further, being excellent in charge/discharge cycle characteristics and rapid charge/discharge characteristics, can be obtained.

DETAILED DESCRIPTION OF THE PREFERRED EMBODIMENTS

Figure 1:
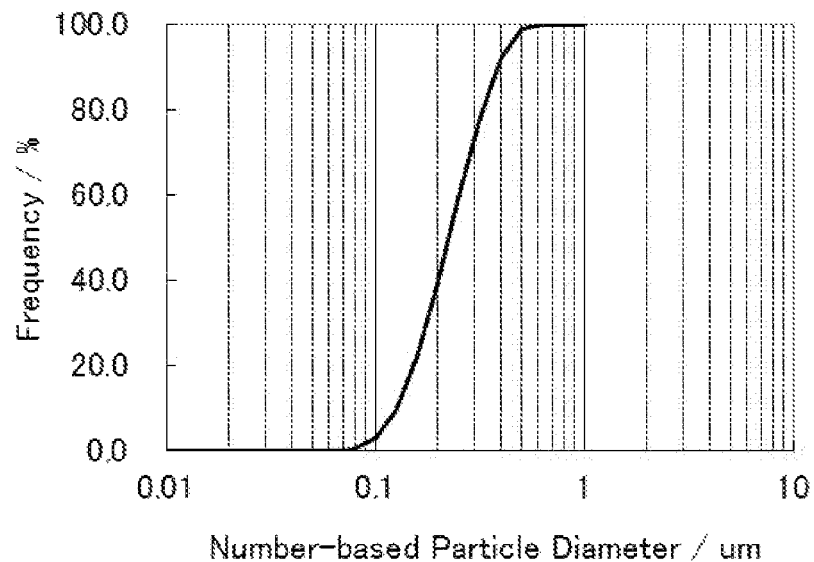
FIG. 1 is a view showing the number-based cumulative particle size distribution on a number basis of the Si fine particle used in Examples 1 to 3.

The negative electrode material for a lithium ion battery according to one embodiment of the present invention is obtained by connecting (A) a fine particle containing an element capable of occluding/releasing a lithium ion and (B) a carbon particle through a chemical bond.

<Fine Particle (A) Containing an Element Capable of Occluding/Releasing a Lithium Ion>

The fine particle (A) as one of constituent substances of the negative electrode material according to one embodiment of the present invention is composed of a material containing an element capable of occluding/releasing a lithium ion. Needless to say, the fine particle (A) means a particle other than the later-described carbon particle (B). The element contained in the fine particle (A) is not particularly limited as long as it can occlude/release a lithium ion. Preferred elements include Si, Sn, Ge and In. The fine particle (A) may be composed of an element as a simple substance or a compound containing the element or may be composed of a compound, mixture, eutectic or solid solution containing at least two members of the above elements. Also, the fine particle (A) may be an aggregate of a plurality of ultrafine particles. Examples of the shape of the fine particle (A) include massive, flaky, spherical and fibrous forms. Among these, spherical and massive forms are preferred. The fine particle (A) may be in the form of a secondary particle.

The substance containing an Si element includes a substance represented by the formula: $M^a_m Si$. This substance is a compound, mixture, eutectic or solid solution containing an element Ma in a ratio of m mol per mol of Si.

$M^a$ is an element excluding Li. Specific examples of $M^a$ include Si, B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb, and Ba. In the case where $M^a$ is Si, this means that the substance is an Si simple substance. In the formula, m is preferably 0.01 or more, more preferably 0.1 or more, still more preferably 0.3 or more.

Specific examples of the substance containing an Si element include an Si simple substance; an alloy of Si and an alkaline earth metal; an alloy of Si and a transition metal; an alloy of Si and a semimetal; a solid soluble alloy or eutectic alloy of Si and Be, Ag, Al, Au, Cd, Ga, In, Sb or Zn; a silicide such as CaSi, CaSi$_2$, Mg$_2$Si, BaSi$_2$, Cu$_5$Si, FeSi, FeSi$_2$, CoSi$_2$, Ni$_2$Si, NiSi$_2$, MnSi, MnSi$_2$, MoSi$_2$, CrSi$_2$, Cr$_3$Si, TiSi$_2$, Ti$_5$Si$_3$, NbSi$_2$, NdSi$_2$, CeSi$_2$, WSi$_2$, W$_5$Si$_3$, TaSi$_2$, Ta$_5$Si$_3$, PtSi, V$_3$Si, VSi$_2$, PdSi, RuSi and RhSi; SiO$_2$, SiC, and Si$_3$N$_4$.

Examples of the substance containing an Sn element include a tin simple substance, a tin alloy, a tin oxide, a tin sulfide, a tin halide, and a tin compound. Specific examples of the substance containing an Sn element include an alloy of Sn and Zn; an alloy of Sn and Cd; an alloy of Sn and In; an alloy of Sn and Pb; a tin oxide such as SnO, SnO$_2$ and $M^b_4$SnO$_4$ (wherein $M^b$ represents a metal element except for Sn); a tin sulfide such as SnS, SnS$_2$ and $M^b_2$SnS$_3$; a tin halide such as SnX$_2$, SnX$_4$ and $M^b$SnX$_4$ (wherein $M^b$ represents a metal element except for Sn, and X represents a halogen atom); and a tin compound such as MgSn, Mg$_2$Sn, FeSn, FeSn$_2$, MoSn and MoSn$_2$.

The 90% particle diameter ($D_{90}$) in the number-based cumulative particle size distribution of the fine particle (A) as measured by a laser diffraction particle size distribution measuring apparatus is preferably 500 nm or less, more preferably 450 nm or less. In this particle size distribution measurement, particle diameters of secondary particles are also included. The fine particle (A) preferably has a particle size distribution substantially free from a particle having a size of 1 μm or more. As the particle diameter becomes larger, the fine particle (A) is more likely to be crushed due to contraction or expansion on charging/discharging to incur an increase in internal resistance and a reduction in charge/discharge cycle characteristics.

The 10% particle diameter ($D_{10}$) in the number-based cumulative particle size distribution of the fine particle (A) as measured by a laser diffraction particle size distribution measuring apparatus is preferably 80 nm or more, more preferably 100 nm or more. Also, the 50% particle diameter ($D_{50}$) in the number-based cumulative particle size distribution of the fine particle (A) as measured by a laser diffraction particle size distribution measuring apparatus is preferably from 100 to 400 nm, more preferably from 200 to 300 nm.

In order to adjust the particle size distribution, a known method for pulverization and/or classification can be utilized. Examples of the pulverizer include a hammer mill, a jaw crusher, and an impact grinder. Also, classification can be performed by air classification and/or by means of a sieve. Examples of the air sifter include a turbo classifier and Turboplex.

<Carbon Particle (B)>

The carbon particle (B) as one of constituent substances of the negative electrode material according to one embodiment of the present invention is a particle composed of a carbon material. As the carbon material, a graphite material such as synthetic graphite, pyrolytic graphite, expanded graphite, natural graphite, scaly graphite and flaky graphite; or a rudimentary crystalline carbonaceous material such as graphitizable carbon, non-graphitizable carbon, glass-like carbon, amorphous carbon and low-temperature fired charcoal, can be used.

The 50% particle diameter ($D_{50}$) in the volume-based cumulative particle size distribution of the carbon particle (B) is preferably from 2 to 40 μm, more preferably from 2 to 15 μm. In this particle size distribution measurement, particle diameters of secondary particles are also included.

A large number of fine particles may make it difficult to increase the electrode density, whereas a large number of large particles may cause coat mottling in the negative electrode on coating and thereby reduce the battery characteristics. For this reason, the carbon particle (B) preferably has a particle size distribution where particles having a particle diameter of 1 to 50 μm are present in a ratio of 90% or more on a volume basis, more preferably a particle size distribution where particles having a particle diameter of 5 to 50 μm are present in a ratio of 90% or more on a volume basis. The 10% particle diameter ($D_{10}$) in the volume-based cumulative particle size distribution of the carbon particle (B) as measured by a laser diffraction particle size distribution measuring apparatus is preferably 1 μm or more, more preferably 2 μm or more. Also, the 50% particle diameter ($D_{50}$) in the volume-based cumulative particle size distribution of the carbon particle (B) as measured by a laser diffraction particle size distribution measuring apparatus is preferably from 3 to 10 μm, more preferably from 4 to 8 μm.

The particle diameters of a carbon particle (B) containing a graphite particle and a carbonaceous layer, a carbon particle (B) composed of a carbon-coated graphite particle having bound thereto a carbon fiber, and a carbon particle (B) composed of a rudimentary crystalline carbonaceous material, described below preferably also have a particle diameter satisfying the above-described conditions.

<Carbon Particle (B) Composed of Graphite Material>

The carbon particle (B) is a graphite particle, preferably s synthetic graphite particle. The graphite particle preferably has a d$_{002}$ of 0.337 nm or less, more preferably 0.336 nm or less. Also, the graphite particle preferably has an L$_C$ of 50 nm or more, more preferably from 50 to 100 nm. Incidentally, d002 is the plane spacing determined from the 002 diffraction line in the powder X-ray diffraction, and L$_C$ is the crystallite size in the c-axis direction determined from the 002 diffraction line in the powder X-ray diffraction.

In a suitable graphite particle, the BET specific surface area is preferably from 1 to 10 m$^2$/g, more preferably from 1 to 7 m$^2$/g. As the raw material of the synthetic graphite particle, a coal-based coke and/or a petroleum-based coke can be used.

The synthetic graphite is preferably obtained by heat-treating a petroleum-based coke and/or a coal-based coke at a temperature of preferably 2,000° C. or more, more preferably 2,500° C. or more. The upper limit of the heat treatment temperature is not particularly limited but is preferably 3,200° C. The heat treatment is preferably performed in an inert atmosphere. For the heat treatment, a conventionally known furnace such as Acheson furnace can be used.

<Carbon Particle (B) Containing Graphite Particle and Carbonaceous Layer>

The carbon particle (B) may be a carbon particle containing a graphite particle and a carbonaceous layer present on the surface thereof (hereinafter, also referred to as a "carbon-coated graphite particle").

The graphite particle is preferably obtained by heat-treating a petroleum-based coke and/or a coal-based coke at a temperature of 2,500° C. or more. Furthermore, the graphite particle preferably has the characteristics of the above-described carbon particle (B) composed of a graphite material.

In the carbonaceous layer present on the surface, the ratio I$_D$/I$_G$ (R value) between the intensity (I$_D$) of an amorphous component-derived peak in a range of 1,300 to 1,400 cm$^{-1}$ and the intensity (I$_G$) of a graphite component-derived peak in a range of 1,580 to 1,620 cm$^{-1}$ as measured by Raman spectroscopy is preferably 0.1 or more, more preferably 0.2 or more, still more preferably 0.4 or more, yet still more preferably 0.6 or more. By providing a carbonaceous layer having a large R value, that is, a layer composed of an amorphous carbon material, on the surface of the graphite particle, intercalation/deintercalation of a lithium ion is facilitated, and rapid charge/discharge characteristics of a lithium ion battery are improved.

The carbon-coated graphite particle can be produced according to a known method. For example, a graphite powder is ground to obtain a graphite particle pulverized to a predetermined size, and the graphite particle is mixed while spraying an organic compound thereon. Alternatively, a graphite particle and an organic compound such as pitch or phenol resin are mixed by an apparatus such as a Hybridizer manufactured by Nara Machinery Co., Ltd., thereby performing a mechanochemical treatment.

The organic compound is not particularly limited but is preferably an isotropic pitch, an anisotropic pitch, a resin, or a resin precursor or monomer. In the case of using a resin precursor or monomer, the resin precursor or monomer is preferably polymerized to make a resin. A suitable organic compound is at least one compound selected from the group consisting of a phenol resin, a polyvinyl alcohol resin, a furan resin, a cellulose resin, a polystyrene resin, a polyimide resin and an epoxy resin. Above all, the organic compound is preferably at least one compound selected from the group consisting of a petroleum-based pitch, a coal-based pitch, a phenol resin, a polyvinyl alcohol resin, a furan resin, a cellulose resin, a polystyrene resin, a polyimide resin and an epoxy resin. The amount of the carbonaceous layer present on the graphite particle surface can be adjusted by the amount of the attached organic compound. The amount of the attached organic compound is preferably from 0.05 to 10 parts by mass, more preferably from 0.1 to 10 parts by mass, per 100 parts by mass of the graphite particle. If the amount of the carbonaceous layer is too large, the battery capacity may decrease.

Subsequently, the graphite particle having the attached organic compound is heat-treated at a temperature of preferably from 200 to 2,000° C., more preferably from 500 to 1,500° C., still more preferably from 900 to 1,200° C. By this heat treatment, a carbon-coated graphite particle is obtained. If the heat treatment temperature is too low, carbonization of the organic compound is insufficient, and hydrogen or oxygen may remain in the carbon particle (B), giving rise to an adverse effect on battery characteristics. Conversely, if the heat treatment temperature is too high, crystallization may excessively proceed to deteriorate the charge characteristics. The heat treatment is preferably performed in a non-oxidizing atmosphere. The non-oxidizing atmosphere includes an atmosphere filled with an inert gas such as argon gas and nitrogen gas. Carbon-coated graphite particles are sometimes fused together to form a lump by the heat treatment. For using the carbon-coated graphite particle as an electrode active substance, the particle is preferably cracked to the above-described particle diameter. The BET specific surface area of the carbon-coated graphite particle is preferably from 0.5 to 30 $m^2/g$, more preferably from 0.5 to 10 $m^2/g$, still more preferably from 0.5 to 5 $m^2/g$.

<Carbon Particle (B) Composed of Graphite Particle Having Bound Thereto Carbon Fiber>

The carbon particle (B) may be a carbon particle obtained by binding a carbon fiber to the surface of the above-described graphite particle or carbon-coated graphite particle. The carbon fiber is preferably a vapor grown carbon fiber.

The carbon fiber used has an average fiber diameter of preferably 10 to 500 nm, more preferably from 50 to 300 nm, still more preferably from 70 to 200 nm, yet still more preferably from 100 to 180 nm. If the average fiber diameter is too small, the handleability tends to become poor.

The aspect ratio of the carbon fiber is not particularly limited but is preferably from 5 to 1,000, more preferably from 5 to 500, still more preferably from 5 to 300, yet still more preferably from 5 to 200. With an aspect ratio of 5 or more, the function as a fibrous electrically conductive material is exerted, and with an aspect ratio of 1,000 or less, good handleability is obtained.

The vapor grown carbon fiber can be produced by introducing the raw material organic compound such as benzene together with a catalyst composed of an organic transition metal compound such as ferrocene into a high-temperature reaction furnace with use of a carrier gas and allowing vapor-phase pyrolysis to proceed. The production method includes, for example, a method of producing a pyrolytic carbon fiber on a substrate (JP-A-60-27700), a method of producing a pyrolytic carbon fiber in suspension (JP-A-60-54998), and a method of growing a pyrolytic carbon fiber on a reaction furnace wall (Japanese Patent No. 2,778434). The vapor grown carbon fiber for use in the present invention can be produced by these methods.

The vapor grown carbon fiber produced in this way can be used directly as the raw material for the carbon particle (B), but in the intact state after vapor-phase growth, a pyrolysate or the like of the raw material organic compound may be attached to the surface or the crystal structure of the carbon fiber may be rudimentary. In this regard, for removing impurities such as pyrolysate or developing the crystal structure, a heat treatment can be performed in an inert gas atmosphere. In order to treat impurities such as pyrolysate, the heat treatment is preferably performed at about 800 to 1,500° C. in an inert gas such as argon. Also, for developing the crystal structure, the heat treatment is preferably performed at about 2,000 to 3,000° C. in an inert gas such as argon. At this time, as a graphitization catalyst, a boron compound such as boron carbide ($B_4C$), boron oxide ($B_2O_3$), elemental boron, boric acid ($H_3BO_3$) and boric acid salt may be mixed with the vapor grown carbon fiber. The addition amount of the boron compound depends on the chemical or physical characteristics of the boron compound that is used and cannot be indiscriminately specified. For example, in the case of using boron carbide ($B_4C$), the addition amount is from 0.05 to 10 mass %, preferably from 0.1 to 5 mass %, based on the vapor grown carbon fiber. As the thus-treated vapor grown carbon fiber, for example, a commercial product such as "VGCF" (trademark, produced by Showa Denko K.K.) can be used.

The method for binding (adhering) the carbon fiber to the surface of the graphite particle or carbon-coated graphite particle is not particularly limited. For example, the carbon fiber is mixed with the organic compound and after attaching the mixture to the graphite particle or carbon-coated graphite particle, a heat treatment is performed, whereby the carbon fiber can be bound to the carbonaceous layer in the course of the carbonaceous layer being formed. The amount of the carbon fiber is preferably from 0.1 to 20 parts by mass, more preferably from 0.1 to 15 parts by mass, per 100 parts by mass of the graphite particle. By using the carbon fiber in an amount of 0.1 parts by mass or more, the graphite particle surface can be widely covered. A carbonaceous layer having electrical conductivity is connecting between the graphite particle and the carbon fiber and therefore, the contact resistance is small. Use of a carbon particle (B) composed of a graphite particle having bound thereto a carbon fiber is greatly effective in enhancing the battery characteristics as compared with addition of a carbon fiber to an electrode.

<Carbon Particle (B) Composed of Rudimentary Crystalline Carbonaceous Material>

The carbon particle (B) may be a carbon particle composed of a rudimentary crystalline carbonaceous material.

The rudimentary carbonaceous material as used herein means, for example, a non-graphitizable carbon, a non-graphitizable carbon, a glass-like carbon, an amorphous carbon, or a low-temperature fired charcoal. Such a rudimentary crystalline carbonaceous material can be prepared according to a known method.

As the raw material of the rudimentary crystalline carbonaceous material, a petroleum-derived substance may be used such as heat heavy oil, pyrolytic oil, straight asphalt, blown asphalt, raw coke, needle coke, calcined coke, and tar or pitch by-produced in ethylene production; a coal-derived substance such as coal tar, heavy fraction obtained from coal tar by removing low-boiling fractions by distillation, coal tar pitch, raw coke, needle coke and calcined coke; a resin-derived substance such as phenol resin, polyvinyl alcohol resin, furan resin, cellulose resin, polystyrene resin, polyimide resin and epoxy resin; or a plant-derived substance such as coconut husk, rice husk, coffee husk, bamboo coal, broadleaf tree and coniferous tree.

The method for producing a rudimentary crystalline carbonaceous material is not particularly limited. Examples of a useful production method include a method comprising a step of heating the raw material at preferably not less than 800° C. and not more than 1,500° C., more preferably not less than 1,000° C. and not more than 1,500° C., under an inert atmosphere for carbonization.

The rudimentary crystalline carbonaceous material has a $d_{002}$ of preferably 0.400 nm or less, more preferably 0.385 nm or less, still more preferably 0.370 nm or less. The lower limit of $d_{002}$ is preferably 0.340 nm. Also, the rudimentary crystalline carbonaceous material preferably has $L_C$ of 50 nm or less.

The rudimentary crystalline carbonaceous material has a BET specific surface area of preferably from 1 to 10 $m^2/g$, more preferably from 1 to 7 $m^2/g$.

<Chemical Bonding of Fine Particle (A) and Carbon Particle (B)>

A chemical bond lies at the connection between the fine particle (A) and the carbon particle (B). The chemical bond is preferably at least one bond selected from the group consisting of a urethane bond, a urea bond, a siloxane bond and an ester bond. The presence of a chemical bond can be confirmed by infrared spectroscopic analysis.

The urethane bond is a bond represented by (—NH—(C=O)—O—). The urethane bond is formed, for example, by the condensation of an isocyanate group and a hydroxyl group.

The urea bond is also called urea bonding and is a bond represented by (—NH—(C=O)—NH—). The urea bond is formed, for example, by the condensation of an isocyanate group and an amino group.

The siloxane bond is a bond represented by (—Si—O—Si). The siloxane bond is formed, for example, by the dehydrating condensation of a silanol group.

The ester bond is a bond represented by (—(C=O)—O—). The ester bond is formed, for example, by the reaction of a carboxyl group and a hydroxyl group.

The chemical bond connecting the fine particle (A) and the carbon particle (B) can be formed by introducing a functional group capable of becoming a base of the chemical bond into each of the fine particle (A) and the carbon particle (B), and reacting both functional groups.

Examples of the combination of functional groups introduced into the fine particle (A) and the carbon particle (B), respectively, include a combination of an isocyanate group and a hydroxyl group, a combination of an isocyanate group and an amino group, a combination of a carboxyl group and a hydroxyl group, and a combination of a silanol group and a silanol group. While introducing one functional group according to the combination above into the fine particle (A), another functional group may be introduced into the carbon particle (B), and vice versa.

In the case where the carbon particle (B) already contains a sufficient amount of the functional group capable of becoming a base of the chemical bond, the carbon particle (B) may be used as it is, but if the amount is not sufficient, the functional group is preferably introduced into the carbon particle (B).

First, in order to facilitate the introduction of the functional group, the carbon particle (B) is preferably subjected to oxidation. The oxidation method is not particularly limited. Examples of the oxidation method include an oxidation method comprising placing the carbon particle (B) under a flow of air, oxygen gas or ozone at a temperature lower than the oxidation temperature measured by differential thermal analysis; and a method of performing the oxidation by using an acid such as nitric acid, sulfuric acid, hydrochloric acid, acetic acid, formic acid, hypochlorous acid, chlorous acid, potassium permanganate, cerium ammonium nitrate, potassium nitrate, and hydrogen peroxide. By means of this oxidation, a hydroxyl group is mainly introduced into the surface of the carbon particle (B).

For the introduction of a functional group, the carbon particle (B) is preferably modified with a silane coupling agent. By modifying with a silane coupling agent, a functional group capable of becoming a base of the chemical bond can be introduced into the surface of the carbon particle (B). The functional group introduced is not particularly limited as long as it undergoes chemical bonding to the fine particle (A), but the functional group is preferably an isocyanate group having high reactivity. The amount of the functional group introduced is not particularly limited but is, in terms of the amount of a silane coupling agent used, preferably from 1 to 20 parts by mass, more preferably from 5 to 15 parts by mass, per 100 parts by mass of the carbon particle (B).

In the case where the fine particle (A) already contains a sufficient amount of the functional group capable of becoming a base of the chemical bond, the fine particle (A) may be used as it is, but if the amount is not sufficient, the functional group is preferably introduced into the fine particle (A).

For the introduction of a functional group, the fine particle (A) is preferably modified with a silane coupling agent. By modifying with a silane coupling agent, a functional group capable of becoming a base of the chemical bond can be introduced into the surface of the fine particle (A). The silane coupling agent used for the modification of the fine particle (A) is preferably a silane coupling agent capable of reacting with the functional group introduced into the carbon fine particle (A) and forming the above-described chemical bond. The functional group introduced is not particularly limited as long as it undergoes chemical bonding to the carbon particle (B), but the functional group is preferably an amino group having high reactivity. The amount of the functional group introduced is not particularly limited but is, in terms of the amount of a silane coupling agent used, preferably from 20 to 60 parts by mass, more preferably from 30 to 50 parts by mass, per 100 parts by mass of the fine particle (A).

Next, the carbon particle (B) having a functional group capable of becoming a base of the chemical bond and the fine particle (A) having a functional group capable of becoming a base of the chemical bond are reacted to form a chemical bond. This reaction can be performed by stirring the carbon particle (B) having the functional group and the fine particle (A) having the functional group in a solvent. As the solvent, butyl acetate or the like is preferably used. After completing the reaction, the solvent is removed by distillation in a rotary evaporator or the like and the powder obtained by drying the residue is cracked, whereby the negative electrode material according to the present invention can be obtained. The amount of the fine particle (A) is preferably from 5 to 100 parts by mass, more preferably from 20 to 70 parts by mass, still more preferably from 30 to 40 parts by mass, per 100 parts by mass of the carbon particle (B).

<Negative Electrode Paste>

The negative electrode paste according to one embodiment of the present invention contains the above-described negative electrode material, a binder, a solvent and, if desired, a conductive additive or the like. In the present invention, a negative electrode material where the fine particle (A) and the carbon particle (B) are connected by a chemical bond is used. The negative electrode paste can be obtained, for example, by kneading the negative electrode material above, a binder, a solvent and, if desired, a conductive additive or the like. The negative electrode paste can be shaped in the form of sheet, pellet or the like.

Examples of the binder include polyethylene, polypropylene, ethylene propylene terpolymer, butadiene rubber, styrene butadiene rubber, butyl rubber, acrylic rubber, and a polymer compound with high ionic conductivity. Examples of the polymer compound with high ionic conductivity include polyvinylidene fluoride, polyethylene oxide, polyepichlorohydrin, polyphosphazene, and polyacrylonitrile. The amount of the binder is preferably from 0.5 to 100 parts by mass per 100 parts by mass of the negative electrode material.

The conductive additive is not particularly limited so long as it imparts electrical conductivity and electrode stability (buffering action against a volume change on intercalation/deintercalation of a lithium ion) to the electrode. Examples thereof include a vapor grown carbon fiber (such as "VGCF" produced by Showa Denko K.K.), and an electrically conductive carbon (such as "Denka Black" produced by Denki Kagaku Kogyo Kabushiki Kaisha, "Super C65" produced by TIMCAL, "Super C45" produced by TIMCAL, and "KS6L" produced by TIMCAL). The amount of the conductive additive is preferably from 10 to 100 parts by mass per 100 parts by mass of the negative electrode material.

The solvent is not particularly limited, and examples thereof include N-methyl-2-pyrrolidone, dimethylformamide, isopropanol and water. In the case of a binder using water as the solvent, a thickener is preferably used in combination. The amount of the solvent is adjusted to give a viscosity which facilitates the coating of the paste on a current collector.

<Negative Electrode Sheet>

The negative electrode sheet according to one embodiment of the present invention has a current collector and an electrode layer covering the current collector.

Examples of the current collector include a nickel foil, a copper foil, a nickel mesh, and a copper mesh.

The electrode layer contains a binder and the above-described negative electrode material. The electrode layer can be obtained, for example, by coating and drying the paste above. The method for coating the paste is not particularly limited. The thickness of the electrode layer is usually from 50 to 200 μm. If the electrode layer is too thick, the negative electrode sheet may not be able to be housed in a standard battery container. The thickness of the electrode layer can be adjusted by the amount of the paste that is coated. The thickness can be also adjusted by drying and then pressure-forming the paste. Examples of the pressure-forming method include a forming method such as roll pressing and calendering. The pressure at the pressure-forming is preferably from about 100 MPa to about 300 MPa (approximately from 1 to 3 ton/cm2).

<Lithium Ion Battery>

The lithium ion battery according to one embodiment of the present invention comprises at least one member selected from the group consisting of a nonaqueous electrolytic solution and a nonaqueous polymer electrolyte, a positive electrode sheet, and the above-described negative electrode sheet.

As the positive electrode sheet, a positive electrode sheet conventionally used in a lithium ion battery, specifically, a sheet containing a positive electrode active material, can be used in the present invention. Examples of the positive electrode active material include $LiNiO_2$, $LiCoO_2$, $LiMn_2O_4$, $LiNi_{0.34}Mn_{0.33}Co_{0.33}O_2$, and $LiFePO_4$.

The nonaqueous electrolytic solution and nonaqueous polymer electrolyte for use in the lithium ion battery are not particularly limited. Examples thereof include an organic electrolytic solution obtained by dissolving a lithium salt such as $LiClO_4$, $LiPF_6$, $LiAsF_6$, $LiBF_4$, $LiSO_3CF_3$, $CH_3SO_3L_1$ and $CF_3SO_3Li$ in a nonaqueous solvent such as ethylene carbonate, diethyl carbonate, dimethyl carbonate, ethyl methyl carbonate, propylene carbonate, butylene carbonate, acetonitrile, propylonitrile, dimethoxyethane, tetrahydrofuran, and γ-butyrolactone; a gelled polymer electrolyte containing polyethylene oxide, polyacrylonitrile, polyvinylidene fluoride or polymethyl methacrylate; and a solid polymer electrolyte containing a polymer having an ethylene oxide bond.

In the electrolytic solution, a small amount of a substance capable of undergoing a decomposition reaction during initial charging of the lithium ion battery may be added. Examples of the substance include vinylene carbonate, biphenyl and propanesultone. The amount added is preferably from 0.01 to 5 mass % of the electrolytic solution.

In the lithium ion battery of the present invention, a separator can be provided between the positive electrode sheet and the negative electrode sheet. Examples of the separator include nonwoven fabric, cloth, microporous film, each mainly composed of a polyolefin such as polyethylene and polypropylene, and a combination thereof.

EXAMPLES

The present invention is described in greater detail below with reference to the following Examples. However, the present invention should not be construed as being limited thereto.

In the following Examples, various physical properties were measured using the following methods.

<Particle Diameter>

Two microspatulas of powder and two drops of nonionic surfactant (Triton-X, produced by Roche Applied Science) were added to 50 ml of water and ultrasonically dispersed for 3 minutes. The resulting liquid dispersion was charged into a laser diffraction particle size distribution measuring apparatus (LMS-2000e) manufactured by Seishin Enterprises Co., Ltd., and the volume-based and number-based cumulative particle size distribution were measured.

<Raman R Value>

This measurement was performed using a laser Raman spectrometry apparatus (NRS-3100) manufactured by JASCO Corporation under the conditions of an excitation wavelength of 532 nm, an incident slit width of 200 μm, an exposure time of 15 seconds, a number of accumulations of 2, and a diffraction grating of 600/mm. From the spectrum measured, the ratio ($I_D/I_G$) between the intensity $I_D$ of a peak in the vicinity of 1,360 $cm^{-1}$ (derived from amorphous component) and the intensity $I_G$ of a peak in the vicinity of 1,580 $cm^{-1}$ (derived from graphite component) was calculated and taken as an R value indicative of the graphitization degree.

<$d_{002}$, $L_C$>

From the 002 diffraction line in a powder X-ray diffraction, the plane spacing $d_{002}$ and the crystallite size $L_C$ in the c-axis direction were determined.

Example 1

Preparation of Fine Particle (A)

An Si particle (Alfa Aesar, CAS7440-21-3, Product No. 44384, primary particle diameter: 50 nm or less) was prepared. FIG. 1 shows the number-based cumulative particle size distribution on a number basis of the Si fine particle. The 10% particle diameter ($D_{10}$) was 140 nm, the 50% particle diameter ($D_{50}$) was 210 nm, and the 90% particle diameter ($D_{90}$) was about 390 nm. The percentage of particles having a particle diameter of 500 nm or less is 98% based on all particles.

In a round-bottom flask with a reflux condenser, 200 mL of toluene, 4 mL of 3-aminopropyltriethoxysilane and 10 g of the Si fine particle above were added in this order and refluxed with stirring. The solution thus obtained was filtered, and the solid content was dried at 80° C. for 15 hours. An Si fine particle having an amino group introduced into the surface thereof was obtained. This was designated as Fine Particle (A-1).

<Preparation of Carbon Particle (B)>

A petroleum-based coke was ground to an average particle diameter of 5 μm and heat-treated at 3,000° C. in an Acheson furnace to obtain a graphite particle. A petroleum pitch was attached to the graphite particle by mixing a petroleum pitch with the graphite particle in a mass ratio of 1%, and carbonization was performed at 1,100° C. in an inert atmosphere. A carbon-coated graphite particle having a BET specific surface area of 2.6 m²/g, $d_{002}$ of 0.3361 nm, $L_C$ of 59 nm, a 10% particle diameter ($D_{10}$) of 2.3 μm, a 50% particle diameter ($D_{50}$) of 5.7 μm, a 90% particle diameter ($D_{90}$) of 11.8 μm, and $I_D/I_G$ (R value) of 0.77 was obtained.

The carbon-coated graphite particle was subjected to oxidation as follows. First, the carbon-coated graphite particle was heat-treated at 600° C. under a flow of air and then placed in a 5% sulfuric acid and 5% potassium permanganate solution, followed by stirring. Then, after centrifugation, the solid content was washed with water and dried. By means of this oxidation, a graphite particle having a hydroxyl group enriched surface was obtained.

In a round-bottom flask with a reflux condenser, 200 mL of toluene, 2 mL of 3-isocyanatopropyltriethoxysilane, and 20 g of the graphite particle subjected to oxidation were added in this order and refluxed with stirring. The solution thus obtained was filtered, and the solid content was dried at 80° C. for 15 hours. A graphite particle having a $D_{50}$ of 5.9 μm having an isocyanate group introduced into the surface thereof was obtained. This was designated as Carbon Particle (B-1).

<Preparation of Negative Electrode Material>

In a round-bottom flask, 1.125 g of Carbon Particle (B-1), 0.375 g of Fine Particle (A-1) and 100 mL of butyl acetate were added in this order and then irradiated with an ultrasonic wave while purging the interior with nitrogen, followed by stirring. Thereafter, the solvent was removed by distillation in a rotary evaporator, and the residue was dried. The solid content thus obtained was cracked in a mortar to obtain a negative electrode material according to the present invention.

Figure 2:
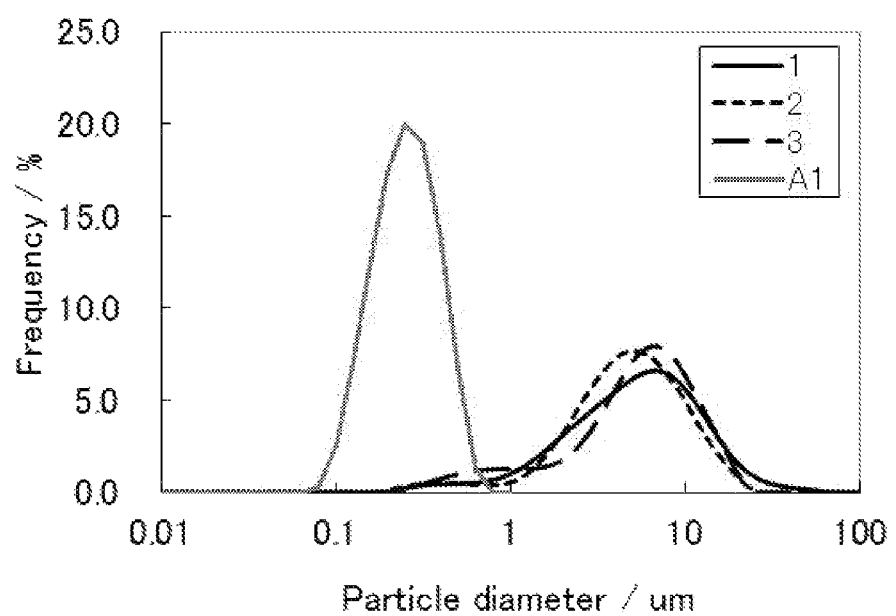
FIG. 2 is a view showing the volume-based particle size distributions of the negative electrode materials of Example 1, Example 2 and Example 3 (lines 1, 2 and 3, respectively) and the number-based particle size distribution of the Si fine particle (A1) used in Examples 1 to 3.
Figure 3:
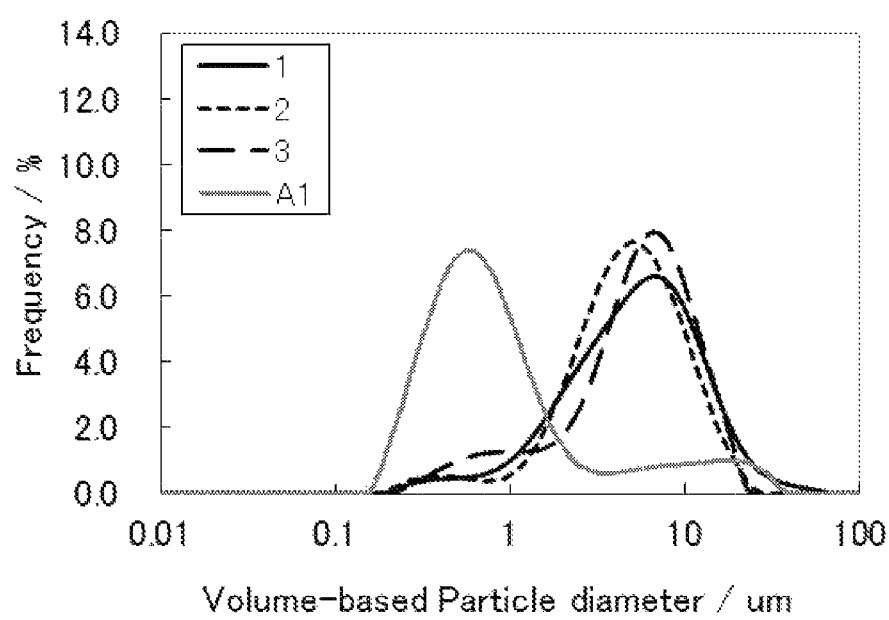
FIG. 3 is a view showing the volume-based particle size distributions of the negative electrode materials of Example 1, Example 2 and Example 3 (lines 1, 2 and 3, respectively) and the Si fine particle (A1) used in Examples 1 to 3.

The negative electrode material thus obtained was analyzed by IR, and as a result, a signal derived from the C=O bond in a urea bond was observed at 1,610 to 1,640 cm$^{-1}$. Also, the negative electrode material had a volume-based particle size distribution shown by line 1 in FIG. 3. Since the peak derived from Fine Particle (A-1) had decreased, this indicates that Fine Particle (A-1) was connected to Carbon Particle (B-1) through a urea bond. In this regard, line A-1 in FIG. 2 shows the number-based particle size distribution of Fine Particle (A-1) and line A-1 in FIG. 3 shows the volume-based particle size distribution of Fine Particle (A-1).

<Production of Negative Electrode Sheet>

An ethylene/vinyl acetate/acrylic acid copolymer aqueous emulsion ("Polysol" [registered trademark]", produced by Showa Denko K.K.) and carboxymethyl cellulose (article No. 1380, produced by Daicel Chemical Industries, Ltd.) were mixed in a solid content mass ratio of 1:1 to prepare a binder.

As the conductive additive, carbon Black (SUPER C65, produced by TIMCAL) was prepared.

100 Parts by mass of the negative electrode material, 100 parts by mass of the binder and 85.7 parts by mass of the conductive additive were mixed and after adding an appropriate amount of water for viscosity adjustment, the mixture was kneaded by a rotating/revolving mixer (manufactured by THINKY Corp.) to obtain a negative electrode paste.

The negative electrode paste obtained above was coated on a copper foil to give a negative electrode layer thickness of 120 μm and then dried at 90° C. for 3 hours. A sheet piece of 15 mm in diameter was punched from the sheet thus obtained, and the sheet piece was vacuum-dried at 50° C. for 12 hours to obtain a negative electrode sheet.

<Manufacture of Battery for Evaluation>

The following operation was performed in a glove box kept under a dry argon gas atmosphere having a dew point of −80° C. or less.

A 2032 type coin cell (diameter: 20 mm, thickness: 3.2 mm) was prepared.

A foil piece of 15 mm in diameter was punched from a lithium foil having a thickness of 0.1 mm and used as the positive electrode sheet. The positive electrode sheet was lightly pressure-attached to an SUS-made spacer by means of a punch, and the resulting laminate was housed in the cap of a coin cell, and an electrolytic solution was then injected into the coin cell. Subsequently, a separator and the negative electrode sheet were placed thereon in this order, and the coin cell case was crimped to the cap of the coin cell and thereby tightly closed to obtain a lithium ion battery for evaluation.

The electrolytic solution was obtained by mixing 1 mass % of vinylene carbonate with a mixed solvent of ethylene carbonate, ethyl methyl carbonate and diethyl carbonate in a volume ratio of 3:5:2 and further dissolving an electrolyte LiPF$_6$ therein at a concentration 1 mol/L.

<Charge/Discharge Test>

The lithium ion battery for evaluation was charged at a constant current of 40 mA/g from a rest potential to 25 mV, then discharged at a constant current of 40 mA/g, and cut off at 2.0 V. This charge/discharge operation was taken as one cycle, and 20 cycles were performed. The charge capacity in the first cycle (initial charge capacity), the discharge capacity in the first cycle (initial discharge capacity), and the discharge capacity in the 20th cycle were measured. The results obtained are shown in Table 1.

In Tables 1 and 2, the initial efficiency is a ratio of the initial discharge capacity to the initial charge capacity, and the discharge capacity retention is a ratio of the discharge capacity in the 20th cycle to the initial discharge capacity.

Example 2

A petroleum-based coke was ground to an average particle diameter of 5 μm and heat-treated at 3,000° C. in an Acheson furnace to obtain a graphite particle having a 10% particle diameter ($D_{10}$) of 2.5 μm, a BET specific surface area of 3.2 m²/g, $d_{002}$ of 0.3363 nm, $L_C$ of 61 nm, a 50% particle diameter ($D_{50}$) of 5.1 μm, a 90% particle diameter ($D_{90}$) of 12.3 μm, and $I_D/I_G$ (R value) of 0.06. Into this graphite particle, a hydroxyl group and then an isocyanate group were introduced in the same manner as in Example 1 to obtain a modified graphite particle having a $D_{50}$ of 5.4 μm. This modified graphite particle was designated as Carbon Particle (B-2).

A negative electrode material was obtained in the same manner as in Example 1, except for changing Carbon Particle (B-1) to Carbon Particle (B-2).

The negative electrode material thus obtained was analyzed by IR. As a result, a signal derived from the C=O bond in a urea bond was observed at 1,610 to 1,640 cm$^{-1}$. Also, the negative electrode material had a volume-based particle size distribution shown by line 2 in FIG. 3. Since the peak derived from Fine Particle (A-1) was decreased, it is presumed that Fine Particle (A-1) was connected to Carbon Particle (B-2) through a urea bond. In this regard, line A-1 in FIG. 2 shows the number-based particle size distribution of Fine Particle (A-1) and line A-1 in FIG. 3 shows the volume-based particle size distribution of Fine Particle (A-1).

A lithium ion battery for evaluation was manufactured in the same manner as in Example 1, except for changing the negative electrode material in Example 1 to the negative electrode material obtained in Example 2, and was subjected to the charge/discharge test. The results are shown in Table 1.

Comparative Example 1

Preparation of Varnish 100 parts by mass of tung oil, 150 parts by mass of phenol and 150 parts by mass of nonylphenol were mixed, and the mixture was kept at 50° C. Subsequently, 0.5 parts by mass of sulfuric acid was added thereto, followed by stirring, and the temperature was gradually raised with stirring and kept at 120° C. for 1 hour. As a result, the tung oil was addition-reacted to the phenols. The temperature of the reaction solution was lowered to 60° C. or less and then, 6 parts by mass of hexamethylenetetramine and 100 parts by mass of formalin with a concentration of 37 mass % were added. After allowing the reaction to proceed at 90° C. for about 2 hours, the reaction solution was vacuum-dehydrated and then diluted by adding 100 parts by mass of methanol and 100 parts by mass of acetone. A varnish having a viscosity of 20 mPa·s (20° C.) was obtained.

<Production of Composite Electrode Material>

The varnish obtained above and ethanol were added to 33.3 parts by mass of Si fine particle (Alfa Aesar, CAS7440-21-3, Product No. 44384, primary particle diameter: 50 nm or less), and the mixture was stirred to obtain a Si solution.

100 parts by mass of the carbon-coated graphite particle obtained in Example 1 was added to the Si solution, and the mixture was kneaded for 30 minutes in a planetary mixer. The resulting kneaded product was vacuum-dried at 80° C. for 2 hours to remove the ethanol and then carbonized by firing at 1,000° C. in an inert atmosphere. A carbon material where a carbon-coated graphite particle was covered with an Si fine particle-containing carbonaceous layer was obtained. The resulting carbon material was cracked in a mortar to obtain a composite negative electrode material.

A lithium ion battery for evaluation was manufactured in the same manner as in Example 1, except for changing the negative electrode material in Example 1 to the composite negative electrode material obtained in Comparative Example 1, and was subjected to the charge/discharge test. The results are shown in Table 1.

Comparative Example 2

A petroleum-based coke was ground to an average particle diameter of 5 μm and heat-treated at 3,000° C. in an Acheson furnace to obtain a graphite particle having a 10% particle diameter ($D_{10}$) of 2.5 μm, a BET specific surface area of 3.2 m$^2$/g, $d_{002}$ of 0.3363 nm, $L_C$ of 61 nm, a 50% particle diameter ($D_{50}$) of 5.1 μm, a 90% particle diameter ($D_{90}$) of 12.3 μm, and an $I_D/I_G$ (R value) of 0.06. This graphite particle was covered with an Si fine particle-containing carbonaceous layer in the same manner as in Comparative Example 1. The resulting carbon material was cracked in a mortar to obtain a composite negative electrode material.

A lithium ion battery for evaluation was manufactured in the same manner as in Example 1, except for changing the negative electrode material in Example 1 to the composite negative electrode material obtained in Comparative Example 2, and was subjected to the charge/discharge test. The results are shown in Table 1.

TABLE 1

| | Initial Charge Capacity [mAh/g] | Initial Discharge Capacity [mAh/g] | Initial Efficiency | Discharge Capacity Retention |
|---|---|---|---|---|
| Example 1 | 2280 | 1154 | 51% | 99% |
| Example 2 | 1804 | 897 | 50% | 96% |
| Comparative Example 1 | 820 | 590 | 72% | 75% |
| Comparative Example 2 | 743 | 602 | 81% | 81% |

According to the production method of the present invention (Examples 1 and 2), a negative electrode material where a fine particle (A) and a carbon particle (B) are connected by a chemical bond can be obtained. As seen in Table 1, in using the negative electrode material of the present invention (Examples 1 and 2), the initial discharge capacity was high, and the discharge capacity retention in the 20th cycle was 96% or more. On the other hand, in using the composite negative electrode material obtained by a conventional production method (Comparative Examples 1 and 2), the initial efficiency was high but the charge/discharge capacity was low.

Example 3

A petroleum-based coke was ground to an average particle diameter of 5 μm and heat-treated at 1,300° C. in a tubular furnace to obtain a rudimentary crystalline carbonaceous material having a BET specific surface area of 2.7 m$^2$/g, a $d_{002}$ of 0.344 nm, a $L_C$ of 2.6 nm, a 10% particle diameter ($D_{10}$) of 2.6 μm, a 50% particle diameter ($D_{50}$) of 5.4 μm, and a 90% particle diameter ($D_{90}$) of 11.0 μm. Into this carbonaceous material, a hydroxyl group and then an isocyanate group were introduced in the same manner as in Example 1 to obtain a modified carbonaceous material having $D_{50}$ of 5.8 μm. This modified carbonaceous material was designated as Carbon Particle (B-3).

A negative electrode material was obtained in the same manner as in Example 1, except for changing Carbon Particle (B-1) to Carbon Particle (B-3).

The negative electrode material thus obtained was analyzed by IR. As a result, a signal derived from the C=O bond in a urea bond was observed at 1,610 to 1,640 cm$^{-1}$. Also, the negative electrode material had a volume-based particle size distribution shown by line 3 in FIG. 3. Since the particle size peak derived from Fine Particle (A-1) had decreased, this indicates that Fine Particle (A-1) was connected to Carbon Particle (B-3) through a urea bond. In this regard, line A-1 in FIG. 2 shows the number-based particle size distribution of Fine Particle (A-1) and line A-1 in FIG. 3 shows the particle size distribution of Fine Particle (A-1).

A lithium ion battery for evaluation was manufactured in the same manner as in Example 1, except for changing the negative electrode material in Example 1 to the negative electrode material obtained in Example 3, and was subjected to the charge/discharge test. The results are shown in Table 2.

Comparative Example 3

A petroleum-based coke was ground to an average particle diameter of 5 μm and heat-treated at 1,300° C. in a tubular furnace to obtain a rudimentary crystalline carbonaceous material having a BET specific surface area of 2.7 m$^2$/g, a $d_{002}$ of 0.344 nm, a $L_C$ of 2.6 nm, a 10% particle diameter ($D_{10}$) of 2.6 μm, a 50% particle diameter ($D_{50}$) of 5.4 μm, and a 90% particle diameter ($D_{90}$) of 11.0 μm. This carbonaceous material was covered with an Si fine particle-containing carbonaceous layer in the same manner as in Comparative Example 1. The resulting carbon material was cracked in a mortar to obtain a composite negative electrode material.

A lithium ion battery for evaluation was manufactured in the same manner as in Example 1, except for changing the negative electrode material in Example 1 to the composite negative electrode material obtained in Comparative Example 3, and was subjected to the charge/discharge test. The results are shown in Table 2.

TABLE 2

| | Initial Charge Capacity [mAh/g] | Initial Discharge Capacity [mAh/g] | Initial Efficiency | Discharge Capacity Retention |
|---|---|---|---|---|
| Example 3 | 2784 | 1273 | 46% | 86% |
| Comparative Example 3 | 650 | 325 | 50% | 83% |

According to the production method of the present invention (Example 3), a negative electrode material where a fine particle (A) and a carbon particle (B) are connected by a chemical bond can be obtained. As seen in Table 2, in using the negative electrode material of the present invention (Example 3), the initial discharge capacity was high and the discharge capacity retention in the 20th cycle was as high as 86%. On the other hand, in using the composite negative electrode material obtained by a conventional production method (Comparative Example 3), it is seen that the initial efficiency was high, but the charge/discharge capacity was low.

What is claimed is:

1. A negative electrode material for a lithium ion battery, wherein the negative electrode material comprises
   a fine particle (A) containing an element capable of occluding/releasing a lithium ion, wherein the element capable of occluding/releasing the lithium ion is at least one element selected from the group consisting of Si, Sn, Ge and In, and
   a carbon particle (B) connected to the fine particle (A) through a chemical bond, wherein the chemical bond is at least one bond selected from the group consisting of a urethane bond, a urea bond, a siloxane bond and an ester bond.

2. The negative electrode material for a lithium ion battery as claimed in claim 1, wherein the amount of the fine particle (A) is from 5 to 100 parts by mass per 100 parts by mass of the carbon particle (B).

3. The negative electrode material for a lithium ion battery as claimed in claim 1, wherein the fine particle (A) has a 90% particle diameter ($D_{90}$) in the number-based cumulative particle size distribution of 500 nm or less.

4. The negative electrode material for a lithium ion battery as claimed in claim 1, wherein the carbon particle (B) has a 50% particle diameter ($D_{50}$) in a volume-based cumulative particle size distribution of from 2 to 15 μm.

5. The negative electrode material for a lithium ion battery as claimed in claim 1, wherein the fine particle (A) is attached to the surface of the carbon particle (B).

6. The negative electrode material for a lithium ion battery as claimed in claim 1, wherein the carbon particle (B) is a graphite particle obtained by heat-treating a petroleumbased coke and/or a coal-based coke at a temperature of 2,500° C. or more.

7. The negative electrode material for a lithium ion battery as claimed in claim 1, wherein the carbon particle (B) is a carbonaceous particle obtained by heat-treating a petroleum-based coke and/or a coal-based coke at a temperature of 800 to 1,500° C.

8. The negative electrode material for a lithium ion battery as claimed in claim 1, wherein the carbon particle (B) contains:
   a graphite particle obtained by heat-treating a petroleum-based coke and/or a coalbased coke at a temperature of 2,500° C. or more, and
   a carbonaceous layer present on the surface of the graphite particle, in which a ratio $I_D/I_G$ (R value) between the intensity (ID) of a peak in a range of 1,300 to 1,400 cm$^{-1}$ and the intensity ($I_G$) of a peak in a range of 1,580 to 1,620 cm$^{-1}$ as measured by Raman spectroscopy is 0.1 or more.

9. The negative electrode material for a lithium ion battery as claimed in claim 8, wherein the carbonaceous layer is obtained by attaching an organic compound to the graphite particle and heat-treating at a temperature of 200 to 2,000° C.

10. The negative electrode material for a lithium ion battery as claimed in claim 9, wherein the organic compound is at least one member selected from the group consisting of a petroleum-based pitch, a coal-based pitch, a phenol resin, a polyvinyl alcohol resin, a furan resin, a cellulose resin, a polystyrene resin, a polyimide resin and an epoxy resin.

11. The negative electrode material for a lithium ion battery as claimed in claim 8, wherein the amount of the carbonaceous layer present on the surface of the graphite particle is from 0.05 to 10 parts by mass per 100 parts by mass of the graphite particle.

12. A method for producing the negative electrode material for a lithium ion battery as claimed in claim 1, comprising:
   a step of modifying a carbon particle with a silane coupling agent to obtain the carbon particle (B), a step of modifying a fine particle containing an element capable of occluding/releasing a lithium ion with a silane coupling agent to obtain the fine particle (A), and
   a step of connecting the carbon particle (B) and the fine particle (A) through the chemical bond.

13. The production method as claimed in claim 12, wherein the carbon particle (B) is obtained by first oxidizing a carbon particle and then modifying the oxidized carbon particle to obtain the carbon particle (B).

14. A negative electrode sheet comprising:
   a current collector, and
   a layer containing a binder, a conductive additive, and the negative electrode material as claimed in claim 1, said layer covering the surface of the current collector.

15. A lithium ion battery comprising:
at least one member selected from the group consisting of a nonaqueous electrolytic solution and a nonaqueous polymer electrolyte,
a positive electrode sheet, and the negative electrode sheet as claimed in claim 14.

16. The lithium ion battery as claimed in claim 15, comprising a nonaqueous electrolytic solution containing at least one member selected from the group consisting of ethylene carbonate, diethyl carbonate, dimethyl carbonate, ethyl methyl carbonate, propylene carbonate, butylene carbonate, γ-butyrolactone and vinylene carbonate.

* * * * *